F. D. WEISSE.
ANATOMICAL MANIKIN HEAD.
APPLICATION FILED OCT. 1, 1912.

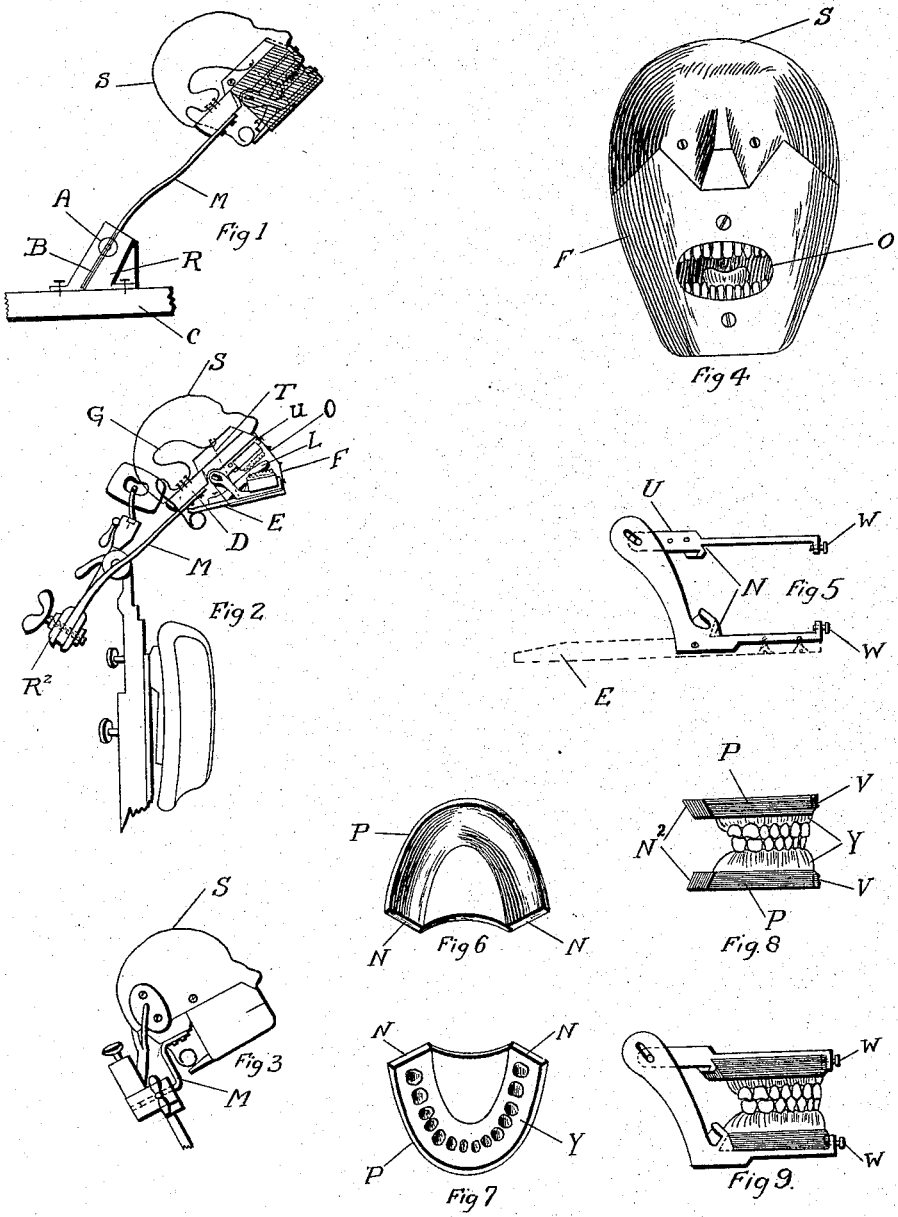

1,166,796.

Patented Jan. 4, 1916.
2 SHEETS—SHEET 2.

UNITED STATES PATENT OFFICE.

FANEUIL D. WEISSE, OF NEW YORK, N. Y., ASSIGNOR TO DENTAL MANIKIN HEAD CO., INC., A CORPORATION OF NEW YORK.

ANATOMICAL MANIKIN-HEAD.

1,166,796.  Specification of Letters Patent.  Patented Jan. 4, 1916.

Application filed October 1, 1912. Serial No. 723,276.

*To all whom it may concern:*

Be it known that I, FANEUIL D. WEISSE, a citizen of the United States, residing at New York, in the county and State of New York, have invented new and useful Improvements in Anatomical Manikin-Heads, of which the following is a specification.

It has been attempted, similar to the way of demonstrating and teaching surgical operations on manikins, to represent the patient of a dental surgeon by a dummy head or manikin jaws. While in the manikins for dental purposes known heretofore only a few features of natural imitation were represented which afforded a limited field of instruction, it is intended by my invention to furnish a manikin head adjustable to dental fixtures in natural position for the operations of an operator, presenting for him the teeth and all parts surrounding the teeth and jaws namely, the tongue, cheek, lips, and the face in general in natural position for operations, the manikin head assuming the relations of the patient's head to the head rest of the dental chair and enabling the operator to perform all operations on the teeth as he does upon the human head in the head rest of a dental chair and also reproducing at the dental bench the chair relation of the patient's head to the head rest of the dental chair.

The experience of dental institutions in the instruction of students in the actual practice of operative and prosthetic dentistry is that a sufficient number of patients for mouth operations and prosthetic appliances are not available for all students to obtain the necessary mouth experience to qualify them for all the emergencies of practice.

The hereafter described manikin head adjusted to dental fixtures affords the facilities of giving a student chances to practice all kinds of dental operations as for example, preparation of tooth cavities, separation of teeth, application of rubberdam, inlay preparation, taking of impressions and bites, preparation of roots and teeth for crowns and bridges and articulating sets of artificial teeth, in fact all operations under exactly the same conditions as though operating upon a patient in a dental chair.

The specific construction of the manikin head is the main object of my invention.

Figure 10:
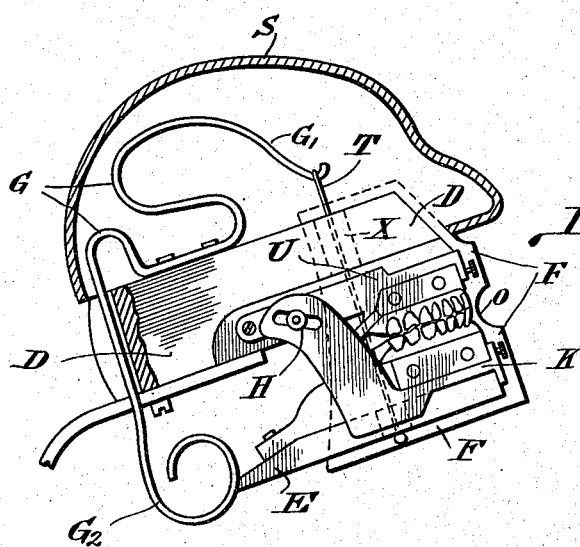
Figure 11:
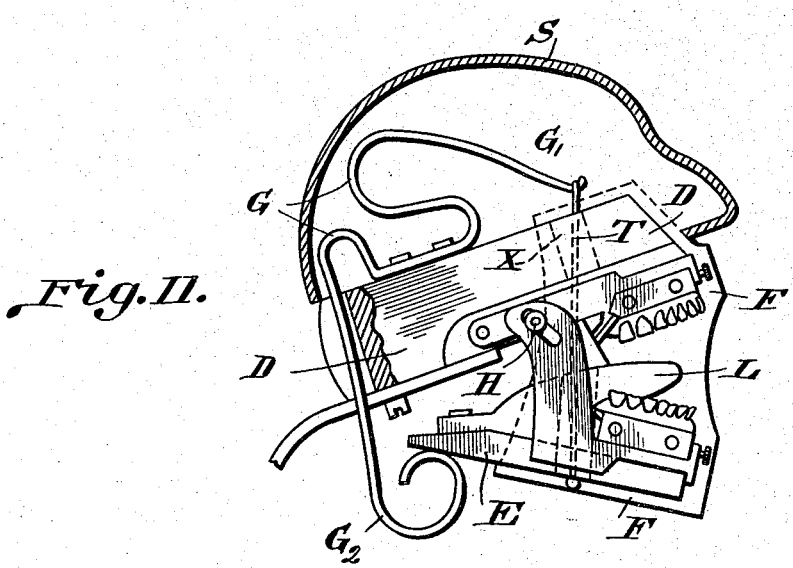

Figure 1 of the accompanying drawing is a side view with parts in section of an anatomical manikin head adjusted to a rest which is connected to a dental laboratory bench; the mouth of the head is closed. Fig. 2 is a side view with parts in section of an anatomical manikin head adjusted to a dental chair; the mouth of the head is opened. Fig. 3 is a lateral view of an anatomical manikin head adjusted to a head rest of a dental chair. Fig. 4 is a front view of an anatomical manikin head, the mouth opened. Fig. 5 represents the articulator of the upper and lower jaws. Fig. 6 is the view of the under surface of the upper jaw plate, it is a metallic casing, representing the maxillary bone without an alveolar process. Fig. 7 is the view of the upper border of the lower jaw, it is a metallic casing, representing the lower maxillary bone with an alveolar process attached, the holes indicating the tooth sockets. Fig. 8 is a lateral view of an upper and lower jaw with alveolar process and teeth attached. Fig. 9 shows how the jaws are adjusted to the articulator forming part of the anatomical manikin head when fastened to the same. Fig. 10 is a lateral view with diagrammatical indication of the internal parts of the head, the jaws closed. Fig. 11 is a lateral view indicating the relation of the internal parts of the head with jaws open.

I am aware that manikin heads and skull articulators were used heretofore for dental purposes. Such heads were made of heavy metals and either not removable from their base, or not adjustable to dental fixtures in a natural position that is occupied by a patient's head in a dental chair, and were expensive. Skull articulators are unhandy and useless for many operations. I know also that a jaw holder is in existence which can be clamped to the back of an ordinary sitting chair. The dental manikins in existence do not interfere with my invention as they are not adjustable in the described way to dental fixtures and besides do not afford the proper position of the jaws and their movements in an anatomical way.

My invention provides the attachment of an anatomical manikin head to the dental fixtures on which the dentist works, i. e. the laboratory bench and the dental operator's chair by means of a bracket.

The parts coöperating with the mechanism of the manikin head are fastened on a base, D, which is made of light material as wood or aluminum. The hollow skull covers the top of the base; it is made of metal preferably aluminum and rests anteriorly over the end of the face mask, F, which is made of flexible material of which rubber is most preferable. The face mask is fastened to the anterior top surface of the base, D, covers the lower anterior and lateral parts of the head, has a mouth opening, O, permitting access to the teeth, tongue and roof of the mouth and extends over both the upper and lower jaws as shown in Fig. 1.

An articulator composed of frames, U and K, for holding upper and lower jaws is fastened by the upper frame, U, on both sides of the base. The articulator frames are provided posteriorly with an angular recess, Fig. 5, N, anteriorly with a horizontally directed set screw, W. The lower articulator frame, Fig. 10, K, movably hinged to the hinge pivots, H, carries an extension, E, made of wood or other light material and is covered by the face mask, F. The double ended spring, G, having an upper end, $G_1$, and a lower end, $G_2$, is fastened in sagittal (before-backward) direction to the base, D, in such manner that its upper end, $G_1$, situated within the skull cavity over a broad perforation, X, of the base may hold the lower jaw closed against the upper by means of the bar, T, which connects the spring end, $G_1$, with the lower articulator part, as seen in Fig. 10, while the lower and posterior spring end, $G_2$, may hold the lower jaw opened by pressing the posterior extension, E, of the lower jaw toward the base, D, the hinge pivots, H, on both sides being a fulcrum.

It must be understood that the combined action of the spring ends $G_1$ and $G_2$ will hold the lower jaw closed against the upper only at the time when the operator has forced the end, E, of the lower jaw from the position shown in Fig. 11 into that shown in Fig. 10. For this purpose the operator standing on the right side of the head moves with the left hand the spring end $G_2$ backward, the posterior end, E, of the lower jaw downward and the anterior part of the lower jaw upward. The spring end $G_1$ pulling upward holds the jaw closed and if the spring end $G_2$ now is allowed to press forward against the extreme end of the lower jaw extension, E, it will aid in holding the jaw closed as shown in Fig. 10. At another time the lower jaw will be held open when an operator moves the spring end $G_2$ from the position of Fig. 10 backward, the end, E, of the lower jaw upward and the anterior part of the lower jaw downward, thereafter allows the spring end $G_2$ by pressing forward to slide under the bottom surface of the end, E.

In order to allow for an exchange of the alveolar process (bone and gums lodging teeth) and to present it in natural elasticity I construct the parts of the jaws of different materials. This is shown in Figs. 6–8. The basal part, P, of the jaws, representing the compact maxillary bones, is made of hard material for example metal, preferably aluminum. The part, Y, covered by the gum in the neighborhood of the teeth known as the alveolar process is made of a slightly elastic material such as rubber; any other flexible material may be used for the part representing the alveolar process and gum. A solid basal part of metal is of great advantage, as an alveolar process with teeth or one without teeth can be attached to the body of this part. The basal part remains for all cases the same, fitting in a very accurate way to the articulator trays. The basal part, P, has posteriorly angular projecting ends, $N^2$, on either side engaging the angular recesses, N, of the articulator trays. An anterior point of engagement is given in the groove, V, met by the point of the set screw, W.

The articulator is hinged in a slot in which a pivot slides as is usual in anatomical articulators. The slots, I, (Fig. 11) are in the ascending parts of the lower articulator halve, the hinge pivots, H, (Fig. 11) are on the upper articulator halve. The teeth made of tin or any other suitable material are glued or riveted in their sockets. A flexible tongue, L, is fastened to one of the head parts; as shown in Fig. 2 of the drawing it is attached to the extension, E, of the lower jaw tray, it is centrally perforated for the passage of the bar, T, connecting the spring, G, with the lower jaw tray.

Having now fully described my invention I claim:

1. In a manikin head of the class described the combination of a skull plate, a head base, artificial jaws, a movable tongue, and a face mask; said mask made of flexible material being attached to the head base and lower jaw and having a mouth opening; said tongue made of flexible material and connected with one of the jaws; said head base covered by said skull plate and said face mask.

2. In a manikin head of the class described the combination of a skull plate, a head base, artificial jaws, a movable tongue, and a face mask; said mask made of flexible material being attached to the head base and lower jaw and having a mouth opening; said head base consisting of light material and said skull consisting of aluminum; said jaws consisting of a metallic casing representing the maxillary bones to which an artificial alveolar process with gums is fastened.

3. In a manikin head of the class described the combination of a skull plate, a base, an articulator, an upper jaw, a lower jaw, and a tongue; said skull plate helmet like covering the top of the base; said base carrying on top a double ended spring within the skull cavity for locking the jaws and balancing the lower jaw; said articulator consisting of an upper tray and a lower tray provided with receding undercuts in the posterior ends and a horizontally directed set screw in the anterior end for the adjustment of the exchangeable jaw bone parts which lodge teeth, the upper tray firmly attached to the base, the lower tray hinged to the upper in an anatomical manner allowing up and down, forward and lateral movements of the lower jaw, the movements controlled by the locking ends of the spring which is attached to the top of the base in sagittal (before-backward) direction; said jaws secured in the articulator trays by means of the undercut in the posterior part and the horizontally directed set screw in the anterior part of the articulator trays, said lower jaw tray having a posterior extension to meet the engaging posterior end of the lock spring which is fastened upon the base, the central part of the lower jaw tray connected with the anterior end of the lock spring by a connecting bar; said tongue fastened to the posterior extension of the lower jaw tray substantially as described and shown.

September 30th, 1912.

FANEUIL D. WEISSE.

Witnesses:
HEINRICH SCHWEITZER,
WM. H. KRUSE.

Copies of this patent may be obtained for five cents each, by addressing the "Commissioner of Patents, Washington, D. C."